Dec. 13, 1955   D. W. SCOFIELD   2,727,133
ELECTRICAL HEATING UNIT
Filed May 28, 1952   2 Sheets-Sheet 1

INVENTOR.
DONALD W. SCOFIELD
BY
Brown, Denk & Lynnestvedt
AGENTS

Dec. 13, 1955  D. W. SCOFIELD  2,727,133
ELECTRICAL HEATING UNIT
Filed May 28, 1952  2 Sheets-Sheet 2

INVENTOR.
DONALD W. SCOFIELD
BY
Brown, Denk & Lynnestvedt
AGENTS

United States Patent Office 2,727,133
Patented Dec. 13, 1955

2,727,133

ELECTRICAL HEATING UNIT

Donald W. Scofield, Glenside, Pa., assignor to Philco Corporation, Philadelphia, Pa., a corporation of Pennsylvania Application May 28, 1952, Serial No. 290,430

6 Claims. (Cl. 219—37)

The invention hereinafter described and claimed relates to cooking equipment and, more particularly, to heating units having especial adaptability as surface cooking elements in electric ranges.

It is common, in present-day electric range practice, to provide surface heating units which comprise a convoluted metallic sheath of generally tubular cross-sectional shape having enclosed therein an electrically conductive element, said units further being provided with an underlying drain pan which also serves as a reflector. While such units have proven reliable and are of high thermal efficiency, they are subject to a number of disadvantages. For example cleanliness represents a problem with units of this kind, since spillage from the cooking vessel is free to drip through the unit and to collect in the underlying pan. Attempts have been made to overcome this disadvantage by the provision of a heating unit having a plate defining a flat, substantially imperforate upper surface which can be cleaned by a simple wiping operation. The aforesaid plates have been made of metal, of ceramic material, and even of certain types of glass. These units have, however, not met with any considerable degree of success primarily because the plates which have comprised the aforesaid imperforate upper surface are of low thermal efficiency. This is particularly the case as respects the glass and ceramic plates, because, in order to impart to them the strength required to withstand mechanical impacts to which they are subjected in use, it has been necessary for such plates to be of undue thickness and weight.

Accordingly, and with the foregoing in mind, it is the general objective of my invention to provide a novel imperforate plate type heating unit which is composed of such materials and is so fabricated as to have high thermal efficiency and yet be extraordinarily resistant to mechanical impact and thermal shock.

It is a further object of my invention to provide a unit of the aforesaid type in which the upwardly presented plate upon which the cooking vessel rests is of infrared-transmissive material, thereby not only enhancing the thermal efficiency of the unit, but also rendering plainly visible the red glow of the conductive element which underlies the plate, and in this way serving to indicate that the unit is energized.

In one aspect of the invention it is also an object to provide range apparatus including a unit of the aforesaid kind in novel combination with means for resiliently mounting such unit within the upper, work surface of the range.

Apparatus constructed in accordance with this invention is also characterized by the fact that it is necessary to use only a minimum amount of certain relatively scarce materials, for example nickel. Further, it is worthy of note that the apparatus of the invention, particularly when the equipment is in use, enhances the appearance of the range.

In the achievement of the foregoing general ends, and first briefly described, the heating units of this invention comprise a simple and relatively inexpensive glass-like plate and metallic pan assembly including means cooperable with a recess provided in the range top to mount the unit resiliently within said recess in a position such that the upper, imperforate surface of the glass plate is substantially flush with adjacent surface portions of the range. Materials spilled upon the plate do not gain access to the underlying region and, accordingly, there is no need to remove the unit from the range or to clean the reflective pan which underlies the mentioned plate. The upper surface of the plate is so configured as to be slightly concave in the central region thereof, thereby virtually eliminating the "wobbling" and spinning of cooking vessels which has frequently presented a problem with plate type units of the prior art. The plate, which is preferably fabricated of unusual glass-like material to which detailed reference is made hereinafter, is provided in its undersurface with a spiral track or groove within which is received any suitable electrically conductive heating element. Very high impact strength is imparted to the assembly through the agency of a resilient mounting which is of such novel type that vertically applied loads result in only slight depression of the unit, such loads being dissipated by subjecting portions of the resilient mounting to torsional deformation.

The best mode of constructing apparatus in accordance with my invention, and of achieving the foregoing and other objects and advantages inherent therein, will be understood from a consideration of the following detailed description considered in the light of the accompanying drawings, in which.

Figure 3:
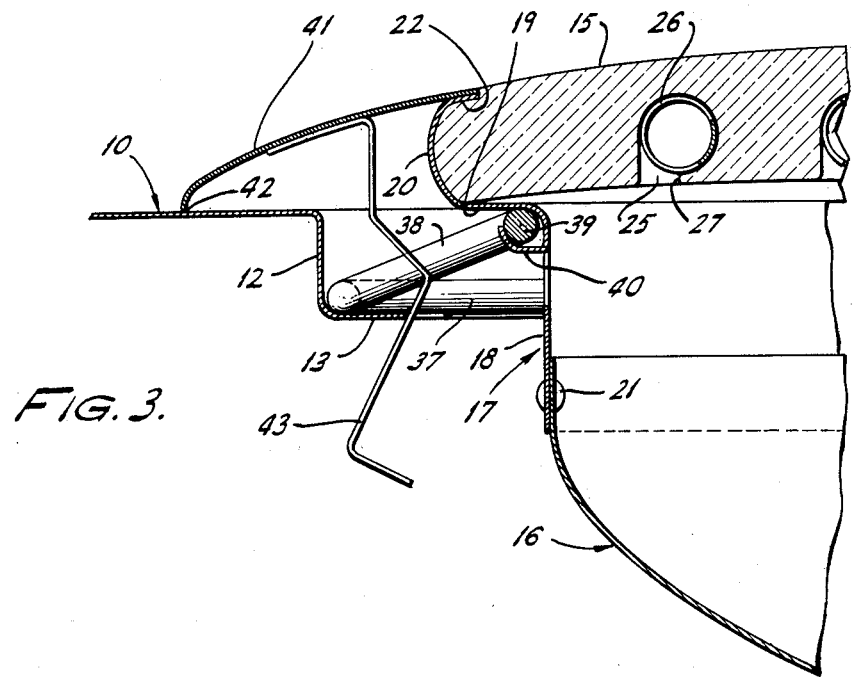
Figure 4:
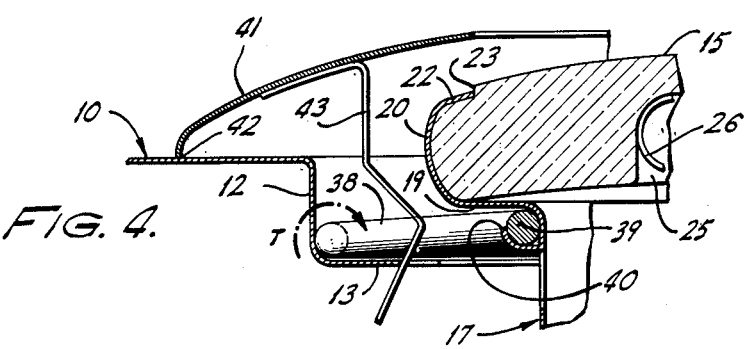
Figure 5:
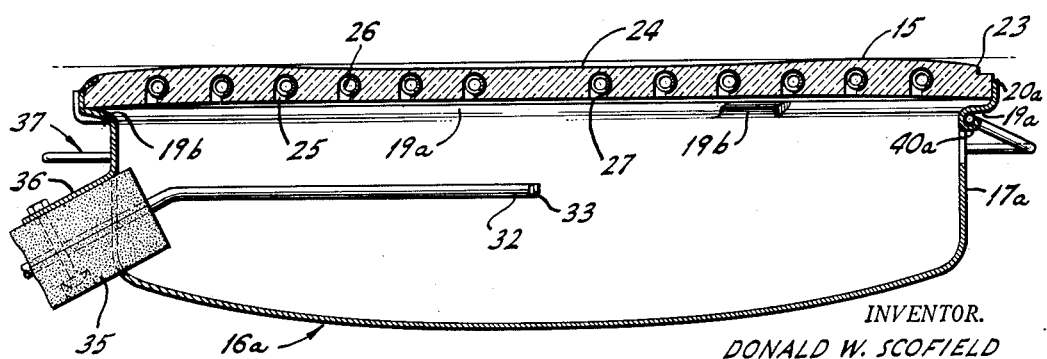

Figures 3 and 4 are fragmentary, sectional views on a considerably enlarged scale and particularly illustrative of the manner in which the heating unit is resiliently mounted, the two views showing the positions of various parts under different conditions encountered in practice; and, Figure 5 is a transverse, sectional view showing the preferred configuration of the upper vessel-supporting surface of the unit, and illustrating an alternative construction for the reflective pan.

Figure 1:
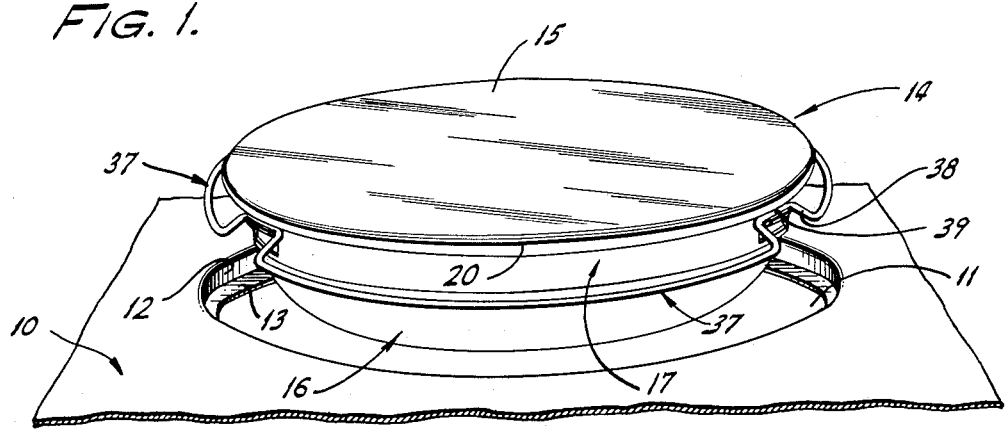
Figure 1 is a perspective view illustrating a plate type heating unit embodying the invention, and showing those portions of the range top which receive and mount the unit.
Figure 2:
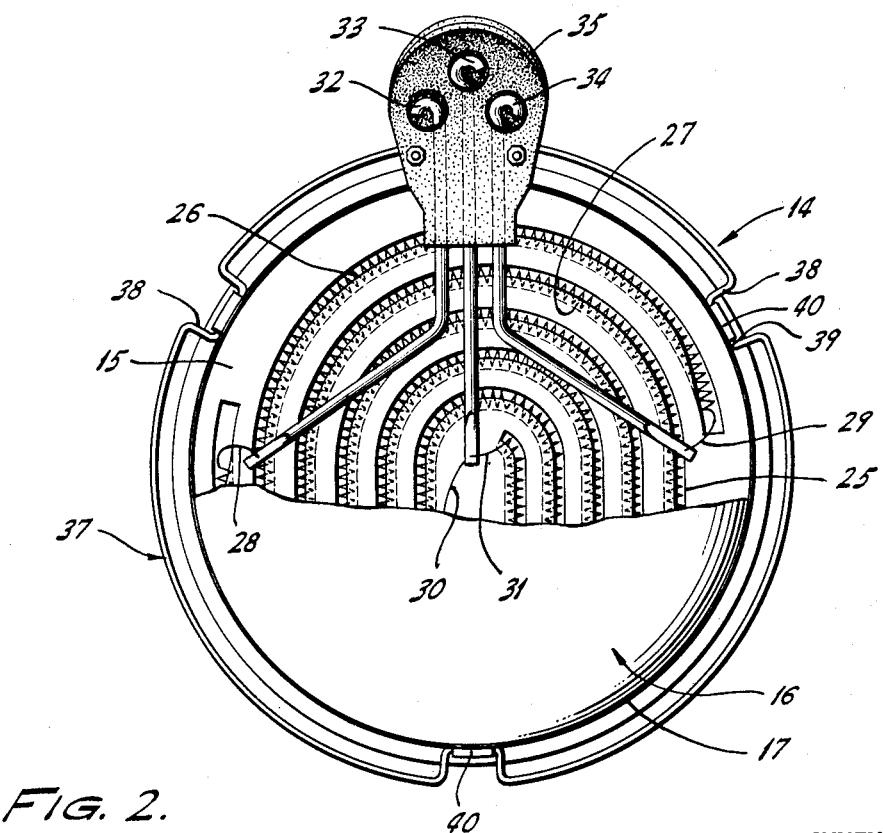
Figure 2 is a plan view looking toward the underside of the heating unit, and with the reflective pan shown fragmentarily to facilitate illustration of certain parts of the apparatus.

With more particular reference to the drawings and, initially, to Figures 1 and 2 thereof, the numeral 10 designates, generally, the flat upper surface of a metallic electric range of known type, this surface being provided with a number of apertures providing recessed seats within the work surface of the range. One of these apertures appears at 11 in Figure 1 and, as will be apparent from the figure, downwardly turned flanging 12 and inwardly directed flange structure 13 provide a rigid seat within which may be received a heating unit constructed in accordance with the invention and shown, generally, at 14. It will be understood that, in certain aspects of the invention, illustration of the apparatus as embodied in electric range structure is purely exemplary, the heating unit per se being capable of wider applicability.

The heating unit 14, comprises a simple and relatively inexpensive assembly including an upper, imperforate plate 15 of a glass-like material to which further reference will be made hereinafter, and a metallic housing or cover member 16 which has a pan portion extending across and substantially covering the lower surface of the glass plate 15. Importantly, the pan portion is spaced from said lower surface to provide a substantial air gap between the latter surface and the pan structure.

I have found that the thermal efficiency of a heating unit of this kind is to a very great extent affected by spacing the reflective cover or pan from the lower surface of the plate which defines the upper vessel-supporting surface of the unit. A considerable spacing results in sharply reducing the temperature of the pan, and therefore enables it to serve primarily as a means for reflecting heat back upwardly through the glass plate and toward the cooking vessel. If the spacing be sharply reduced, or eliminated, the temperature of the pan rises unduly and the pan serves as a re-radiator with consequent loss of heat downwardly. Therefore, and in spite of the apparent desirability of reducing insofar as possible the thickness of the heating unit, substantial space is provided between the pan 16 and the lower surface of the glass plate 15.

As indicated above, the plate is fabricated of glass or like material, it being desired that the plate be relatively transparent to infrared radiation and that it be highly resistant to mechanical impact and to thermal shock. These requirements limit the materials which can be employed and it has been found, in practice, that a plate which is constituted largely of silica (a preferred composition comprises 96% silica) gives excellent results. Glass of this type has recently been developed by Corning Glass Works and is merchandised under the trade name "Vycor." Although this material is in itself quite strong, my experiments have shown that a novel resilient mounting should be provided for the plate in order to enable it to withstand the impacts to which it will be subjected in practice. Further reference to this aspect of my invention is made in what follows.

Referring again to the underlying pan member 16 it will be seen that this member includes flange portions 17 which extend toward the lower surface of the plate 15 and have means adapting them for releasable securement to edge portions of the plate. In one embodiment of the invention, illustrated in Figures 1 to 4, the aforesaid means takes the form of an annular ring 18 formed separately from the pan 16, and having outwardly and upwardly turned flanging 19 and 20, respectively (see particularly Figures 3 and 4). Ring 18 is secured to the pan 16 in any convenient manner and as represented at 21. At spaced regions about the upper edge of the flange portion 20 inturned tabs 22 are provided, these being bent to overlie the upper surface of the glass plate 15 and to register with the peripheral groove 23 (see particularly Figure 4) provided about the edge of plate 15. While this mode of securement of the plate to the pan has been found to be satisfactory, it is to be recognized that, in the broader aspect of the invention, other methods of securement are contemplated. A somewhat different way of effecting the necessary support of plate 15 is illustrated in Figure 5, wherein there is shown an embodiment of the invention in which the pan flanging 17a and the portions 19a and 20a which receive the glass plate 15 are formed integrally with the pan 16a. Small pads 19b, raised from the metal of the flanging 19a, provide seats for the plate 15. Preferably three such seats are used, which seats not only insure stable mounting for the plate but also minimize the conductive contact between the plate and the flanged pan.

With further reference to the showings of Figure 5, there is illustrated in that figure the novel central concavity with which the upper surface of the plate 15 is preferably provided. This depression or concavity is shown at 24 and is of importance since it has been found almost completely to eliminate the "wobbling" and spinning of cooking vessels which has heretofore presented a problem when attempts were made to manufacture plate type heating units. Such configuration causes the plate top to present an annular "land," which will accommodate cooking vessels the lower surfaces of which are concave downwardly, as is frequently the case after the vessels have been used for an extended period of time.

As appears in Figures 2, 3 and 4, the undersurface of the plate 15 is configured to provide a groove 25 within which is received an electrically conductive wire or element 26 of known, spiral type. In order to prevent inadvertent displacement of the element, one edge of the groove 25 is so turned, as at 27, as to overlie a portion of the element 26 and to retain the same within the groove 25. The ends 28, 29, 30 and 31 of the two conductive elements used are connected to terminals 32, 33 and 34, in the manner clearly shown in Figure 2.

The terminals are carried by a non-conductive block 35, of generally known type, which block is, in turn, supported by the pan structure 16. To accommodate the block the pan structure is suitably apertured and a lug is provided to maintain the terminal block in assembled relation with respect to the pan. This can be done in a variety of ways, one mode of accomplishing such securement being clearly shown in Figure 5 in which the numeral 36 designates a lug supporting the terminal block 35. This lug may be formed as a part of ring 18, or it may be struck from the material of the pan, thereby also providing a mounting aperture for the terminal block (see Figure 5).

As indicated above, it is necessary for a unit of this kind to have high thermal efficiency and to be able to withstand thermal shock and mechanical impact. These requirements constituted the primary respects in which the imperforate, plate type units of the prior art proved unsatisfactory. As has already been described, the thermal efficiency of the unit of my invention is high, being fully comparable with efficiencies realized in the best sheath type units. This result flows not only from the particular material used for the glass plate, and from the fact that the underlying stainless steel reflecting pan 16 is spaced substantially below the plate, but also by virtue of the fact that provision is made to mount the unit within the range top in such a way as to minimize loss of heat by conduction.

It is a primary feature of the invention that this mounting means also enables the unit to withstand mechanical impacts much greater than would normally be encountered in service. This mounting is, as aforesaid, resilient and is of such a character as to meet the requirement that vertically applied static and impact loads are dissipated without damaging the unit and in such fashion that there is but little downward movement of the unit in response to such loads. It will be appreciated that to meet the above-stated varied requirements in a mounting structure constitutes a very considerable problem.

As best appears in Figures 2, 3 and 4 this resilient mounting structure preferably takes the form of a single turn loop of relatively rigid spring material 37 which underlies the plate 15 and surrounds the pan 16. This ring, as will be apparent from the showings of Figures 3 and 4, is held against expansion movements in the plane of the ring by bearing outwardly against the recessed seat provided by the flanges 12 and 13 which define the edge of the unit-receiving aperture formed in range top 10. The more extended portions of the spring ring which make contact with the range top structure terminate in short radially extending wire sections 38—39, the portions 38 constituting lever arms, and the short pan-supporting portions 39 underlying the section 19 of the upper edge flanging and thereby supporting the pan 16. Conveniently, and as shown at 40 and 40a (compare Figures 3 and 5) lugs are struck from the metal of the pan flanging, these lugs securing the short pan-supporting portions 39 of the spring to the heating unit.

Under conditions of applied load the portions 38 serve as lever arms subjecting the main body of the spring ring to torsional forces. The manner in which these torsional forces are applied is illustrated by the arrow designated T and appearing in Figure 4. Since the ring is prevented from spreading in its plane beyond the range flanging 12, the application of a downwardly directed force results in slight lowering of the plate, as is illustrated in Figure 4, and consequent downward swinging movement of the lever arms 38 as will be appreciated from a comparison of Figures 3 and 4. Because the spring is anchored to the unit at several points about its periphery, the vertically applied forces are dissipated by torsional deformation of the spring ring throughout a considerable portion of the length of the ring. Such a mounting, although relatively rigid and although it permits only slight vertical travel of the heating unit, has been found in practice to enable the heating unit to withstand very great static and impact loads.

The crank-like portions 38 are normally disposed at a relatively slight angle with respect to the horizontal—an angle of about 30° in the form illustrated—and therefore the variation in projected length of the lever arms which occurs when they are swung downwardly is minimized. To accommodate this small variation slight clearance is provided between the spring structure and the contacting portions of the pan and the range top.

It is to be noted that, in a spring mounting of the type described, there is a relatively small area of contact between the short spring portions 39 and the heating unit and, consequently, the conduction of heat from the unit to the spring is not great. However such heat as is transmitted to the spring is very readily dissipated, conductively, to the range top through the rather extended part of the spring which is in contact with the top. Thus, although the spring mounting is such that substantial vertically applied forces are dissipated in torsion throughout a considerable length of spring wire, the loss of heat to the range top is reduced to a minimum.

When the unit is mounted in the range, and for good appearance, as well as to prevent access of dirt and moisture to the region of the flanges 12 and 13, there is provided an annular finish ring 41 which has a lower edge seating against the range top, as at 42, and an upper annular edge which registers with the aforesaid plate groove 22 when the heating unit is in normal position. This finish ring may conveniently be secured to the structure through the agency of a plurality of spring members 43 secured to the undersurface of the ring and bearing resiliently against the inner edge of the horizontal range flanging 13.

Because of the unusually high resistance to impact loads which is imparted to the glass plate by the use of spring mounting of the kind above described, reference will be made to the results achieved in practice. Impact tests were made using a one-pound steel ball (1⅞" diameter) which was dropped freely upon a 7" diameter, 5/16" thick silica glass plate of the kind preferably employed. In the absence of resilient mounting, it was found that the majority of plates shattered when the ball was dropped from an elevation of four inches. When the spring mounting of my invention was applied, however, the plates readily withstood the impact which resulted when the ball was dropped from a height of ten inches. Since a sphere having a diameter of 1⅞" makes almost point contact with the plane surface of the plate, it is apparent that the unit stresses are exceedingly high when the ball is dropped from a height of ten inches.

From the foregoing description it will be understood that by this invention there is provided an improved, imperforate, plate type heating unit and range assembly in which the heating unit is of high thermal efficiency and yet is so constructed and mounted as to be extraordinarily resistant to mechanical impact and thermal shock. Such a unit, while novel and presenting a number of advantages not hitherto achieved, is fully interchangeable with sheath type units now in common use and without necessitating any modification in the structure of the range top.

It is to be understood that the apparatus of the invention is susceptible of modification in certain respects without departing from the spirit of the invention. For example certain modifications might be made in the resilient mounting structure as, for instance, several discontinuous similarly formed sections might be substituted for the continuous spring ring 37. Such an embodiment, if the ends of the discontinuous sections are firmly anchored or secured in the range top structure, will dissipate applied forces by torsional deformation of the spring members, in substantially the same manner as has already been set forth with respect to the illustrated embodiment. Further it is apparent that, insofar as the concepts of the present invention are concerned, the electrically conductive element 26 may be secured within or carried by the glass plate 15 in any convenient manner. However it will be recognized that the invention contemplates such changes and modifications as may come within the scope of the appended claims.

I claim:

1. In an electrical heating unit a substantially imperforate heat-shock resistant plate of glass or the like, said plate being relatively transparent to infrared radiation and having an upper surface adapted to support a cooking vessel and a lower surface provided with an electrically conductive heating element, and a metallic member having a pan-like portion substantially covering said lower surface and spaced from the same to provide a substantial air gap between said lower surface and said portion, said member further having peripheral flange portions extending from said pan-like portion toward said lower surface and having means channel-shaped in cross-section, said means overlying edge portions of said plate to secure said flange portions to said plate, the said flange portions of said member further including individual spaced sections providing raised seats upon which said plate is supported, said seats providing stable support for said plate and reducing the conductive contact between said plate and member, said member being effective to prevent access of dirt and moisture to the air gap region between said plate and said member, and that surface of said member which is presented toward said lower surface being characterized by high heat-reflectivity.

2. An electrical heating unit in accordance with claim 6, and further characterized in that the plate is substantially circular, and said resilient mounting means comprises a generally ring-like member of spring material configured to provide several of the stated relatively extended portions and several of the stated short portions, said extended and said short portions being connected through crank-like parts which, in response to forces applied downwardly against the upper surface of said plate, serve to subject said extended portions to torsional deformation and dissipate such forces while permitting only limited movement of said plate under the influence of said forces.

3. In combination with electric range top structure having downwardly extending flanged portions providing a mounting recess within said top structure, an electrical heating unit comprising: a substantially imperforate heat-shock resistant plate of glass or the like, said plate being relatively transparent to infrared radiation and having an upper surface adapted to support a cooking vessel and a lower surface provided with an electrically conductive heating element; a metallic member substantially covering said lower surface and having means adapted for securement to edge portions of said plate; and resilient means disposed to support said plate and having portions reacting against said recessed seat to mount said heating unit within said top structure in a position such that the upper imperforate surface of said plate is substantially flush with and closely adjacent to upper surface portions of the top structure, the stated portions of said resilient means being of metallic material and of relatively extended length, said portions further terminating in crank means extending toward and supporting said plate, forces applied against the upper surface of said plate being transmitted through said crank means to said extended portions and being dissipated by torsional deformation of the latter.

4. In an electric range, range top structure having a downwardly flanged substantially circular aperture providing a recessed seat therein, a substantially imperforate generally circular heat-shock resistant plate of glass or the like overlying said recessed seat, and a generally ring-like spring element reacting against the structure of said recessed seat and the undersurface of said plate at spaced regions disposed around peripheral portions of said plate, to mount said plate with freedom for limited movement in directions substantially normal to the surface of the plate, said ring-like spring element having spaced portions inset substantially radially and providing crank-like portions supporting said plate, the construction and arrangement being such that said crank-like portions are swung downwardly in response to lowering of the plate to subject said spring element to torsional deformation.

5. In an electrical heating unit a substantially imperforate heat-shock resistant plate of glass or the like, said plate being relatively transparent to infrared radiation and having an upper surface adapted to support a cooking vessel and a lower surface provided with an electrically conductive heating element, a metallic member substantially covering said lower surface and having flange portions closely underlying the peripheral edge of said plate and extending upwardly about said edge for securement to said plate, and resilient mounting means bearing against and secured to said underlying portions, said resilient mounting means extending from said heating unit into position to react against fixed structure of a range or the like and mounting said plate with freedom for limited movement in directions substantially normal to the surface of the plate.

6. In an electrical heating unit a substantially imperforate heat-shock resistant plate of glass or the like, said plate being relatively transparent to infrared radiation and having an upper surface adapted to support a cooking vessel and a lower surface provided with an electrically conductive heating element, a metallic member substantially covering said lower surface and having means adapted for securement to edge portions of said plate, and resilient mounting means extending from said heating unit into position to react against fixed structure of a range or the like, said resilient mounting means comprising a length of spring wire a relatively extended portion of which lies in a plane underlying and spaced from the lower surface of said plate and is disposed to react against said fixed structure, and a relatively short portion of which is offset from said extended portion toward the lower surface of said plate and supports the plate.

References Cited in the file of this patent

UNITED STATES PATENTS

| | | |
|---|---|---|
| 1,492,540 | Kercher et al. | Apr. 29, 1924 |
| 2,091,905 | Bensel et al. | Aug. 31, 1937 |
| 2,152,126 | Young | Mar. 28, 1939 |
| 2,179,934 | Jones | Nov. 14, 1939 |
| 2,250,357 | Challet | July 22, 1941 |
| 2,329,451 | Beggs | Sept. 14, 1943 |
| 2,445,086 | Rodwick | July 13, 1948 |
| 2,644,071 | Charbonneau | Sept. 30, 1953 |

FOREIGN PATENTS

| | | |
|---|---|---|
| 68,454 | Switzerland | June 17, 1914 |
| 375,692 | Great Britain | June 30, 1932 |
| 816,806 | France | Aug. 18, 1937 |